United States Patent
Joynson

[15] 3,683,473
[45] Aug. 15, 1972

[54] TOOLHOLDERS WITH DETACHABLE CUTTING INSERTS

[72] Inventor: Sidney Edmund Joynson, Garforth, Leeds, England

[73] Assignee: Wickman Wimet Limited, Tile Hill, Coventry, Warwickshire, England

[22] Filed: Feb. 25, 1970

[21] Appl. No.: 14,168

[30] Foreign Application Priority Data

March 4, 1969   Great Britain..........11,344/69

[52] U.S. Cl. ....................................................29/96
[51] Int. Cl. ............................................B26d 1/00
[58] Field of Search...........29/96, 97, 98, 105, 105 A

[56] References Cited

UNITED STATES PATENTS

| | | |
|---|---|---|
| 2,808,638 | 10/1957 | Filippi ............................29/96 |
| 2,860,402 | 11/1958 | Proksa............................29/96 |
| 2,854,735 | 10/1958 | Dukes.............................29/96 |
| 3,491,421 | 1/1970 | Holloway........................29/96 |
| 3,084,416 | 4/1963 | Broughton......................29/96 |
| 3,191,262 | 6/1965 | Gustafson.......................29/96 |
| 3,189,975 | 6/1965 | Hammers .......................29/96 |
| 3,369,284 | 2/1968 | Stier...............................29/96 |

Primary Examiner—Harrison L. Hinson
Attorney—Holman, Glascock, Downing & Seebold

[57] ABSTRACT

A toolholder for clamping a symmetrical cutting insert comprising a recessed shank for reception of the insert, a chip breaker engaging one face of the insert a top clamp engaging the chip breaker, and the chip breaker being pivotally mounted about an axis spaced from the insert and the clamp being movable between a clamping position and a releasing position in which the chip breaker can be pivoted to permit removal of the insert.

4 Claims, 5 Drawing Figures

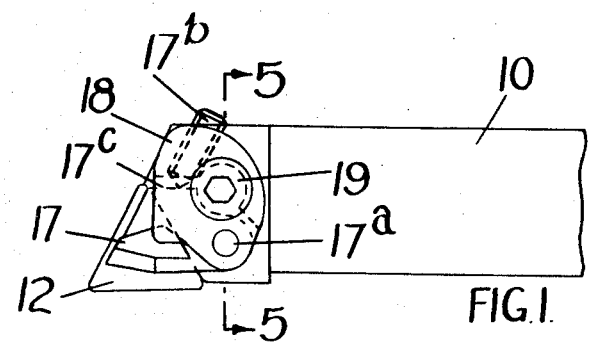
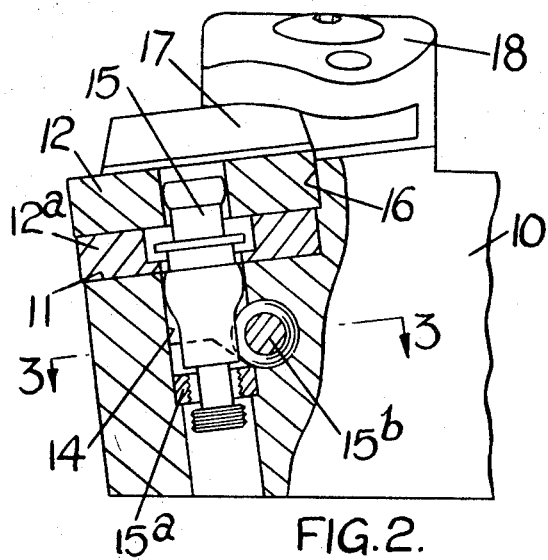
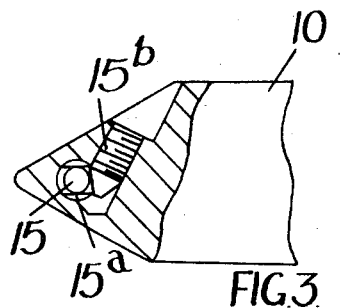
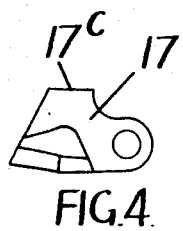
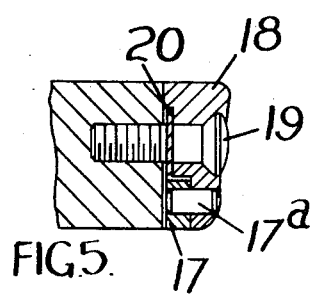
INVENTOR
Sidney Edmund Joynson
ATTORNEYS

TOOLHOLDERS WITH DETACHABLE CUTTING INSERTS

This invention relates to toolholders intended to receive a symmetrical indexable cutting insert.

In use, loads are applied to the cutting insert in various directions and hence the means for supporting the insert in the toolholder must be so designed as to hold the insert firmly against the action of all such loads. The problem applies particularly to copying lathes in which the insert is subjected to loads in a larger number of directions than in other machines.

The object of the invention is to provide a toolholder of the kind referred to in a form in which the insert can be adequately supported against loads in a number of directions.

According to the present invention a toolholder for clamping a symmetrical cutting insert about the central axis of which it is indexable, comprises a shank, a recessed seating in the shank for the cutting insert, a chip breaker engageable with the chip breaker, the chip breaker being pivotally mounted relatively to the shank about an axis which is spaced from the insert, the clamp being movable between a releasing position in which the chip breaker can be pivoted to a position permitting removal of the insert and a clamping position in which the insert and chip breaker are secured on the shank.

The invention will now be described by way of example with reference to the accompanying drawings in which:

FIG. 1 is a plan view of the operative end portion of a toolholder constructed in accordance with the invention.

FIG. 2 is a fragmentary cross-sectional view of the toolholder,

FIG. 3 is a cross-sectional view on the line 3—3 in FIG. 2,

FIG. 4 is a plan view of the chip breaker alone, and

FIG. 5 is a cross-sectional view on the line 5—5 in FIG. 1.

The toolholder comprises a shank 10 which, at its operative end, is tapered. The tapered end has a shallow recessed seating 11 for reception of a cutting insert 12. The cutting insert is mounted on anvil piece 12a and is of equilateral triangular shape. The insert 12 and anvil 12a have respective central holes which are aligned with one another and with a stepped hole 14 in the shank 10 when the cutting insert is in place.

The hole 14 in the shank 10 contains a clamping bar 15 which protrudes also into the holes in the insert 12 and anvil 12a. The clamping bar 15 has an enlarged center portion about which it can move angularly to force the insert 12 against a shoulder 16 formed at the edge of the recessed seating 11. The hole in the anvil 12a provides clearance for this clamping bar 15. The other end of the clamping bar 15 is engaged in a retaining piece 15a in the form of a threaded ring with a central transverse slot at one end. The end of the clamping bar 15 is screw threaded and is threaded through the ring until an undercut in the clamping bar 15 smaller than the minor diameter of the thread is reached. The clamping bar 15 can be tilted within the confines of the slot of the retaining piece 15a as shown in FIG. 3. To control the tilting of the clamping bar 15 there is a screw 15b engaged in the tool shank 10 and having a tapered end engaging the side of the clamping bar 15. This arrangement is also shown in FIG. 3.

Opposite side faces of the insert 12 are flat and against the side remote from the anvil 12a is engaged a chip breaker 17. The chip breaker 17 has an operative side defining two inclined and relatively angularly disposed faces. It is pivotally mounted relatively to the shank 10 about the axis of a pin 17a which is fixed in a further clamp 18. The axis of the pin 17a is spaced from the face 16 of the recess 11. To adjust the position of the operative edge of the chip breaker 17 relatively to the operative edge of the insert 12, there is a screw 17b engaged in the clamp 18 and bearing on a face of the chip breaker at its side remote from the operative edge. This edge is indicated at 17c.

To clamp the chip breaker 17 against the face of the insert 12, the further clamp 18 has an end portion engaging the chip breaker and having a hole in which is secured the pin 17a. It is clamped by a screw 19 surrounded by a spring clip 20 between the clamp 18 and the shank 10. This serves as a spacer to prevent the clamp 18 from falling when an insert is not fitted.

There are tenons on the face of the clamp 18 engaging grooves in the tool shank 10 to prevent rotation of the clamp about the axis of the screw 19. (These are not shown). In a further example the clamp 18 has a pin engaging a hole in the shank and the pin 17a also extends into another hole in the shank.

The cutting insert 12 is intended to be indexed to present a fresh cutting edge and corner and in order that it can be indexed it is merely necessary to slacken the screw 19 to an extent to permit the chip breaker 17 to swing about the axis of the pin 17a, whereupon the chip breaker 17 can be moved out of the position shown to expose the insert 12. The clamping bar 15 for the insert must be released before the insert can be removed for indexing or replacement. The toolhoder is particularly useful in a copying lathe in which loads on the cutting insert occur in a number of different directions. All such loads are resisted either by the clamp formed by the clamping bar 15 or by the further clamp 18.

The shoulder 16 may also comprise two faces to support for example two faces of a square or triangular insert. The insert may be inclined in a known manner to give positive or negative rakes.

In an alternative construction the chip breaker and the shank 10 have respective interengageable formations whereby relative pivotal movement between, when the clamp 18 is engaged, is prevented.

The clamping of the insert by the clamping bar 15 may be achieved by other means or alternatively omitted, reliance being placed, in the latter case, upon the clamp which holds the chip breaker also to hold the insert in place.

Having thus described my invention what I claim as new and desire to secure by Letters Patent is:

1. A tool holder for clamping a symmetrical cutting insert, about the central axis of which it is indexable, comprising a shank, a recessed seating in the shank having a surface on which one side face of the cutting insert engages, a chip breaker engageable with an opposite side face of the insert, a top clamp releasably securable by a screw in engagement with the chip breaker, the chip breaker being pivotally mounted on the shank about an axis which is spaced from the recessed seating and from said screw, the top clamp being non-rotatably movable away from the chip breaker to a releasing position in which the chip breaker can be pivoted to a position permitting removal of the insert and the top clamp also being non-rotatably movable towards the chip breaker to a clamping position in which the insert and chip breaker are clamped in superimposed relationship on the shank.

2. A toolholder as claimed in claim 1 in which the shank has a hole alignable with a central hole in the insert, a clamping bar engageable in the holes in the shank and insert, and means for forcing the clamping bar in a direction to clamp an edge of the insert against a corresponding edge in the recessed seating.

3. A toolholder as clamied in claim 1 including an adjusting screw whereby the chip breaker can be adjusted relatively to the shank of the toolholder.

4. A toolholder as claimed in claim 1, in which the top clamp carries a pin located in the shank and serving as a pivot about the axis of which the chip breaker moves.

* * * * *